(12) United States Patent
Huang et al.

(10) Patent No.: US 9,718,016 B2
(45) Date of Patent: Aug. 1, 2017

(54) APPARATUS FOR EXTRACTING RADIOACTIVE SOLID PARTICLES AND METHOD THEREOF

(71) Applicant: Institute of Nuclear Energy Research, Atomic Energy Council, Executive Yuan, R.O.C., Taoyuan (TW)

(72) Inventors: Chun-Ping Huang, Taoyuan (TW); Bing-Hong Chang, Hsinchu County (TW); Jia-Ying Wu, Tainan (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 80 days.

(21) Appl. No.: 14/887,507

(22) Filed: Oct. 20, 2015

(65) Prior Publication Data

US 2017/0106318 A1 Apr. 20, 2017

(51) Int. Cl.

| | |
|---|---|
| *B01D 35/143* | (2006.01) |
| *B01D 35/157* | (2006.01) |
| *B01D 35/26* | (2006.01) |
| *G21F 9/06* | (2006.01) |
| *G21F 3/00* | (2006.01) |
| *B01D 45/02* | (2006.01) |
| *B01D 46/00* | (2006.01) |
| *G21F 9/28* | (2006.01) |

(52) U.S. Cl.
CPC ......... *B01D 45/02* (2013.01); *B01D 46/0056* (2013.01); *G21F 9/28* (2013.01)

(58) Field of Classification Search
CPC .... B01D 35/143; B01D 35/157; B01D 35/26; B01D 35/1573; G21F 9/06; G21F 3/00
USPC .......... 55/385.1, 431, 479, DIG. 9; 222/192, 222/630; 376/314; 406/114; 976/DIG. 375
See application file for complete search history.

(56) References Cited

U.S. PATENT DOCUMENTS

| | | | | |
|---|---|---|---|---|
| 4,049,405 A | * | 9/1977 | Goldsmith ............. | B01D 53/02 376/313 |
| 4,061,480 A | * | 12/1977 | Frye ................... | B01D 46/0094 422/159 |
| 4,127,397 A | * | 11/1978 | O'Nan, Jr. ................ | G21F 9/00 222/192 |

(Continued)

*Primary Examiner* — Jacob T Minskey
*Assistant Examiner* — Minh-Chau Pham
(74) *Attorney, Agent, or Firm* — Jackson IPG PLLC; Demian K. Jackson

(57) ABSTRACT

An apparatus is provided to extract radioactive solid particles. An extracting nozzle is used to extract radioactive solid particles. Then, a separator is used to separate out the radioactive solid particles into a storing container. The radioactive solid particles are avoided from entering a suction pump. Not only the suction pump is not polluted, but also the secondary waste is not increased. By designing a falling inlet of a suction channel at a position having a specific height, the amount of the radioactive solid particles being extracted is under control. There is a radiation-protection device outside of the storing container to minimize radiation dose. The separator and the storing container can be rapidly detached by remote operation, so that operators are avoided from receiving over-dose radiation. Hence, the present invention improves the level of technology and automation for handling radioactive waste.

8 Claims, 5 Drawing Sheets

(56) References Cited

U.S. PATENT DOCUMENTS

| | | | | |
|---|---|---|---|---|
| 2004/0088957 | A1* | 5/2004 | Fisher | B01D 50/002 55/350.1 |
| 2008/0237502 | A1* | 10/2008 | Fago | G21F 5/018 250/506.1 |
| 2015/0096927 | A1* | 4/2015 | Packhem | G21F 9/06 210/85 |

* cited by examiner

APPARATUS FOR EXTRACTING RADIOACTIVE SOLID PARTICLES AND METHOD THEREOF

TECHNICAL FIELD OF THE INVENTION

The present invention relates to extracting radioactive particles; more particularly, relates to handling radioactive waste while avoiding increase in radiation dose received and enhancing level of technology and automation to achieve a significant breakthrough in the related field.

DESCRIPTION OF THE RELATED ARTS

The non-bulk radioactive waste, such as ion exchange resin (powder/granular), adsorbent (zeolite), wall shavings and other powders for decontamination, generated on operating and after decommissioning nuclear facilities needs to use proper radiation shields and transmission devices during processes of loading, transporting and operating.

Usually, the resin in an ion exchange column is operated in a saturated water environment, so water can be used as a medium for taking out and delivering. However, for storage safety, granular radioactive spent ion exchange resin will be dehydrated to be stored in a barrel and a stability system needs to be developed for polluted spent ion exchange resin. Moreover, because the stability system may be fed in an amount less than a whole bucket and direct dumping cannot effectively control the feed rate, it is required to properly design a method and an apparatus for taking out material. In another application, when a device or object is contaminated by radioactive material, a mechanical method (such as sanding, scraping or excluded, etc.) is used for metal or concrete surface decontamination. A demand is arisen for collecting scraps thus generated. Unlike other methods of waste collection and transportation, radioactive waste treatment needs further designs for radiation shielding, particulate-matter pollution prevention and job operation convenience.

Conventionally, solid particles are carried by liquid or gaseous fluid. The solid particles carried by liquid fluid are solid particles mixed into a fluid to form a mixture to be collected through pumping. If the solid particles are radioactive solid particles, a further treatment is required that the contaminated liquid needs to be processed through solid-liquid separation and purification. Hence, not only a subsequent processing system is added; but also secondary waste might have to be dealt with. In the other hand, the solid particles carried by gaseous fluid are generally handled through vacuum technology, such as vacuum cleaners, etc. A suction device is used to extract solid particles to be collected in a dust bag; and, then, the solid particles are taken out from the dust bag manually. However, the taking out is not easy. If the solid particles are radioactive solid particles, operators may be polluted during operation. Radiation dose may be increased or dust collection equipment may be contaminated with secondary waste increased.

Hence, the prior arts do not fulfill all users' requests on actual use.

SUMMARY OF THE INVENTION

The main purpose of the present invention is to use an extracting nozzle to extract radioactive solid particles to be separated out to a storing container by a separator while being avoided from entering into a suction pump so that the suction pump is not polluted by secondary waste.

Another purpose of the present invention is to control an amount of the extracted radioactive solid particles by designing a height of a falling inlet of a suction channel.

Another purpose of the present invention is to set a radiation-protection device outside of the storing container to minimize radiation dose.

Another purpose of the present invention is to quickly release both the separator and the storing container through remote operation, where radiation dose received by persons are reduced; technology and automation are enhanced; and a major breakthrough is achieved on handling radioactive solid particles.

To achieve the above purposes, the present invention is an apparatus for extracting radioactive solid particles, comprising a suction pump, a separator, an extracting nozzle, a storage barrel, a radiation-protection device, a storing container and a program controller, where the suction pump has a suction pipe to extract gas; the separator comprises a body and a chamber surrounded by the body; the body has a suction channel and a gas outlet; the suction channel is set in the chamber and connected with the body; the gas outlet is set on top of the body and adjacent to the suction channel; the gas outlet is connected with the suction pipe; the suction channel has a suction inlet set at an upper section of the suction channel to be protruded out from top of the body; the suction channel has a falling inlet set at a lower section of the suction channel to be protruded out from bottom of the body; the extracting nozzle has an extracting pipe connected to the suction inlet to extract radioactive solid particles to the separator; the storage barrel is installed with and connected to the extracting nozzle to store the radioactive solid particles; the radiation-protection device is installed and connected to the separator; a confined space is formed in the radiation-protection device as a shield to block out radiation; the storing container is removable and set in the confined space; the storing container is communicated with the suction channel; and the program controller is electrically connected with the suction pump and the extracting nozzle to control starting and stopping of the suction pump and the extracting nozzle in accordance with operating signals. Accordingly, a novel apparatus for extracting radioactive solid particles is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
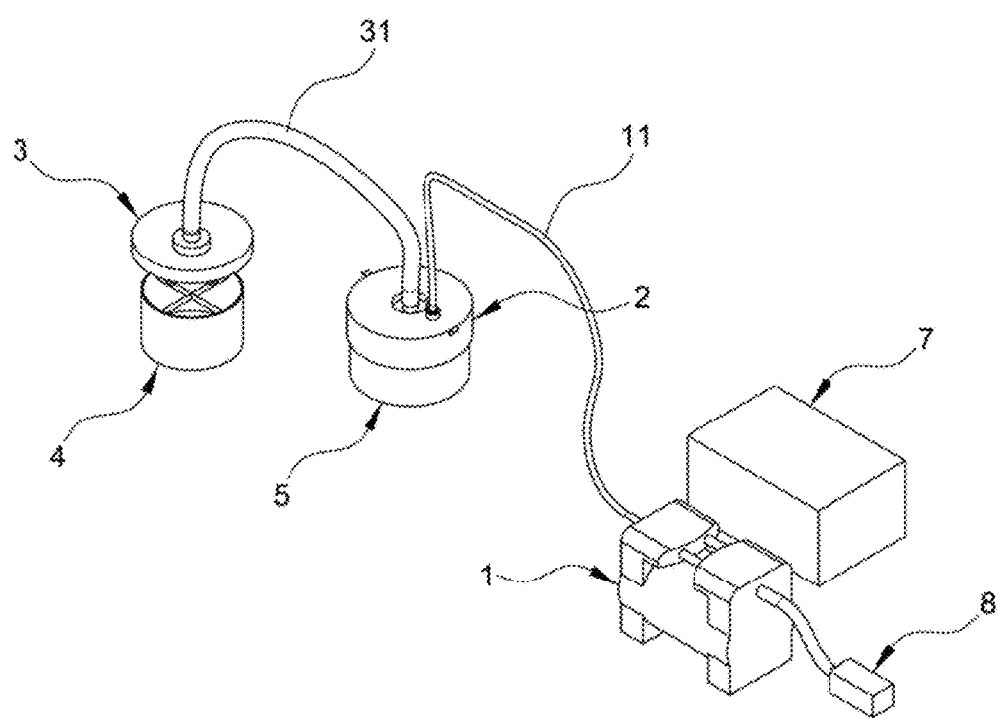
FIG. 1 is the structural view showing the preferred embodiment according to the present invention.
Figure 2:
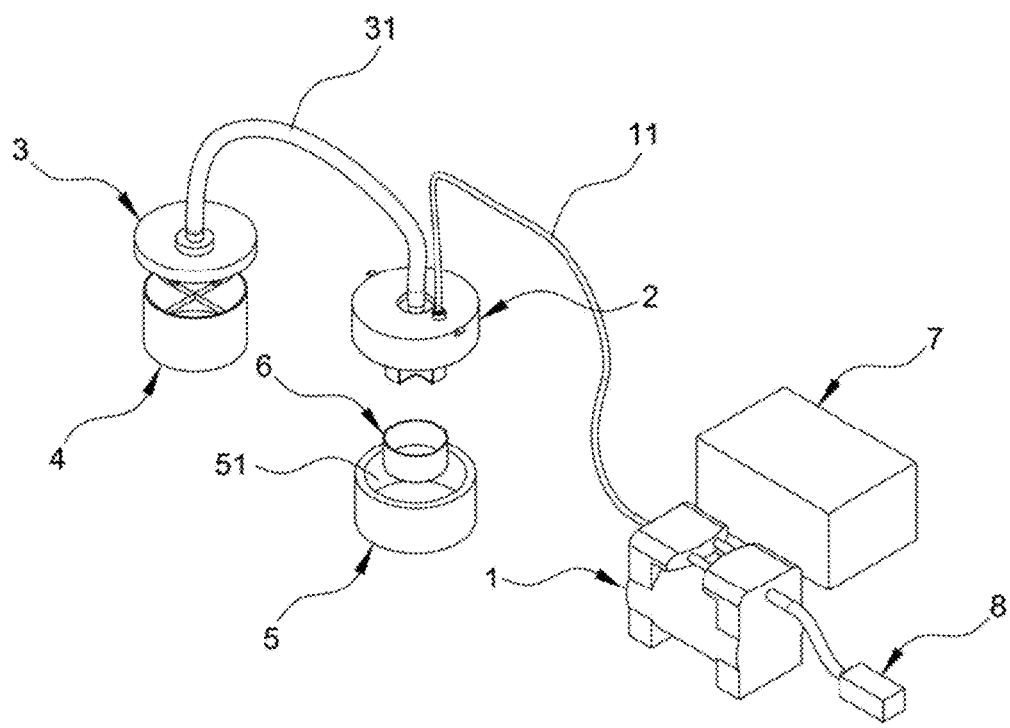
FIG. 2 is the explosive view showing the preferred embodiment.

The following description of the preferred embodiment is provided to understand the features and the structures of the present invention.

Please refer to FIG. 1-FIG. 5, which are a structural view and an explosive view showing a preferred embodiment according to the present invention; a cross-sectional view showing a separator; and views showing the separator on extracting and stopping extracting. As shown in the figures, the present invention is an apparatus for extracting radioactive solid particles, comprising a suction pump 1, a separator 2, an extracting nozzle 3, a storage barrel 4, a radiation-protection device 5, a storing container 6, and a program controller 7.

The suction pump 1 is provided with a suction pipe 11 to extract gas from the suction pipe 11. The suction pump 1 provides required vacuum suction and is installed with a high-efficiency particle filter 8 at rear end to deal with particulate matters in gas.

The separator 2 is a centrifugal filter, comprising a body 21 and a chamber 22 surrounded by the body 21. The body 21 has a suction channel 23 set in the chamber 22 and connected with the body 21; and a gas outlet 24 is set on top of the body 21 and adjacent to the suction channel 23. The gas outlet 24 is connected with the suction pipe 11 of the suction pump 1. The suction channel 23 has a suction inlet 231 set at an upper section to be protruded out from top of the body 21; and a falling inlet 232 is set at a lower section to be protruded out from bottom of the body 21. A gasket 25 is circumferentially set on periphery of the falling inlet 232. The separator 2 uses gravity or a grille design to store the extracted radioactive solid particles 9 in the storing container 6 while particulate matters in gas are discharged to the suction pump 1.

The extracting nozzle 3 is installed to the storage barrel 4 and set with an extracting pipe 31. The extracting pipe 31 is connected to the suction inlet 231 of the suction channel 23. The extracting nozzle 3 extracts the radioactive solid particles 9 in the storage barrel 4 to the separator 2.

The radiation-protection device 5 is installed to be connected with the separator 2, where a confined space is set within as a shield to block out radiation.

The storing container 6 is removably set in the confined space 51 of the radiation-protection device 5 and the storing container 6 is communicated with the suction channel 23 of the separator 2. The storing container 6 is a particularly designed container, which is hanged by a crane and has a radiation protection layer for transporting and storing radioactive solid particles 9 as well as processing related experiments.

The program controller 7 is electrically connected with the suction pump 1 and the extracting nozzle 3 to control starting and stopping of the suction pump 1 and the extracting nozzle 3 in accordance with operating signals.

Thus, a novel apparatus for extracting radioactive solid particles is obtained.

The separator 2 can be rapidly detached from the storing container 6. When the suction pump 1 is actuated, the separator 2 and the storing container 6 have a solid combination owing to the difference between inner and outer pressures. When the suction pump 1 stops running, the separator 2 is fixed on the storing container 6 due to gravity and can be easily departed by using the crane.

Figure 3:
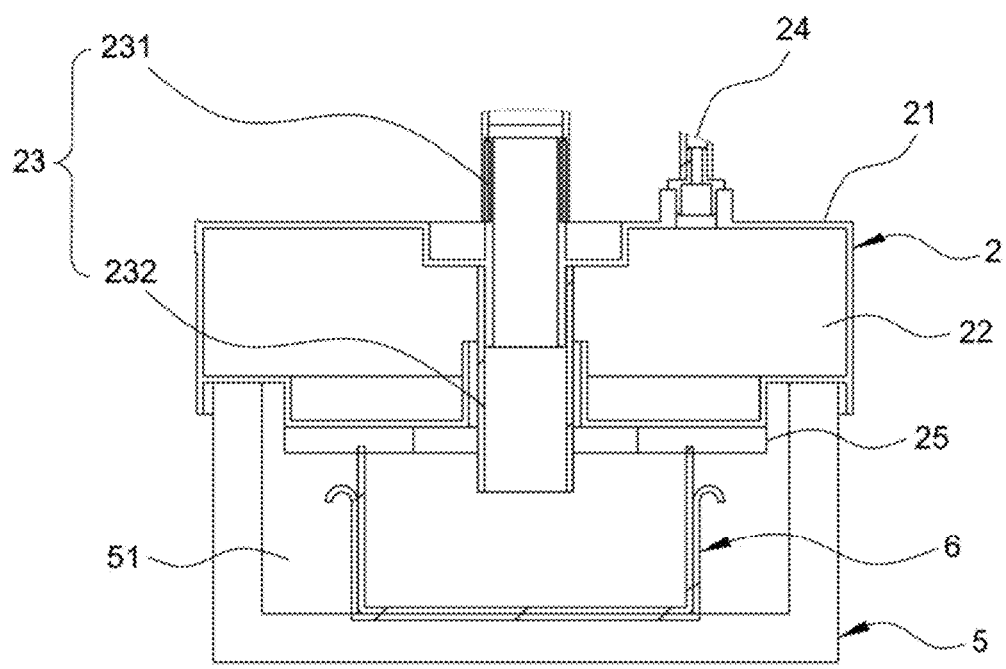
FIG. 3 is the cross-sectional view showing the separator.
Figure 4:
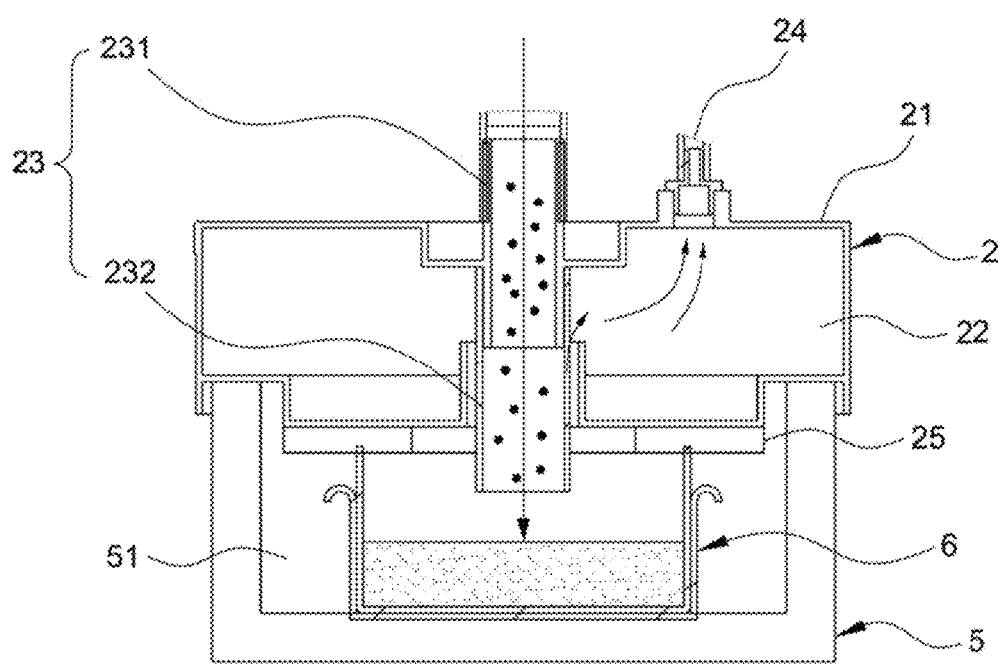
FIG. 4 is the view showing the separator on extracting.

On using the present invention, as shown in FIG. 1, FIG. 3 and FIG. 4, the suction pump 1 is actuated to pump out the air in the storing container 6 and the separator 2 while, by using the gasket 25, air is prevented from being supplied from outside for obtaining a negative pressure. Under the negative pressure, the extracting nozzle 3 extracts the radioactive solid particles 9 in the storage barrel 4 to the separator 2. After entering into the suction inlet 231 of the suction channel 23 and reaching the falling inlet 232, the radioactive solid particles 9 enter into the storing container 6 through the falling inlet 232 of the suction channel 23 owing to gravity and velocity for separating solids and gas. The falling inlet 232 has a height different from the gas outlet 24 for preventing the radioactive solid particles 9 from being discharged to the suction pump 1 by following air flow and further damaging equipments and causing pollution. The gas along with particulate matters enters into the suction pump 1 from the gas outlet 24.

Figure 5:
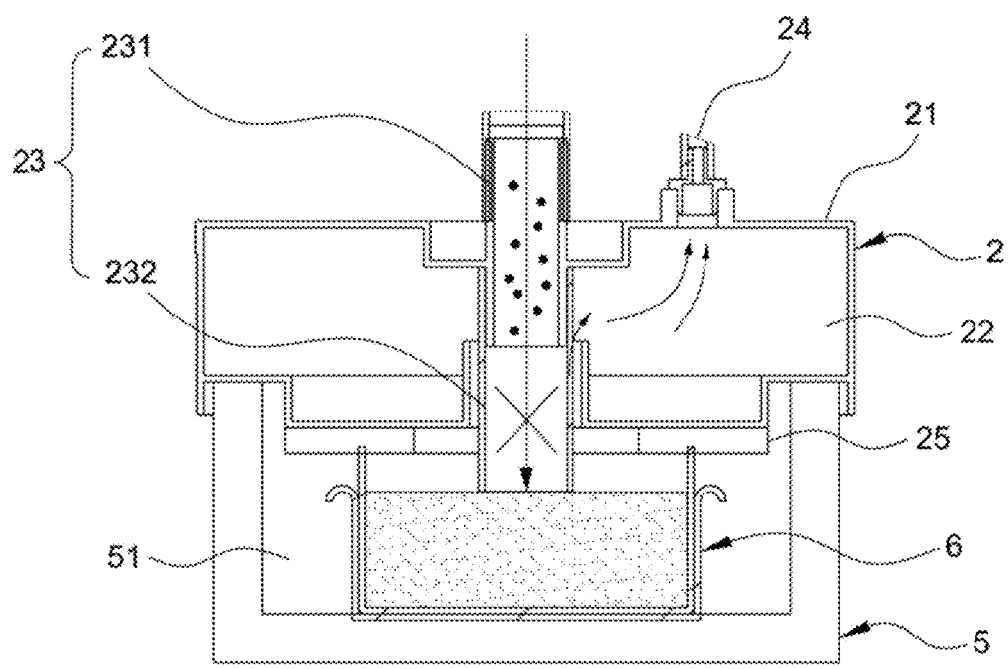
FIG. 5 is the view showing the separator on stopping extracting.

When a height of the radioactive solid particles 9 stored in the storing container 6 reaches the height of the falling inlet 232 of the suction channel 23, the suction channel 23 is directly blocked to stop extracting the radioactive solid particles 9, as shown in FIG. 5. Hence, the present invention controls an amount of the extracted radioactive solid particles 9 by adjusting the height of the falling inlet 232 of the suction channel 23.

Since, on handling radioactive solid particles, proliferation of radioactive contamination and increase of personnel radiation dose should be avoided to meet the regulation of "As Low As Reasonably Achievable" (ALARM). The operating persons need to have specific knowledge and a radiation-protection device for handling radioactive solid particles. If particulate matters appear during the process, human health may be affected. Therefore, remote control is the key for handling radioactive solid particles.

Hence, the present invention uses an extracting nozzle to extract radioactive solid particles. Then, the particles are separated out by a separator to a storing container while being avoided from entering into a suction pump. As a result, the suction pump is not polluted by secondary waste. At the same time, the amount of the extracted particles is controlled by designing the height of a falling inlet of a suction channel. A radiation-protection device is set outside of the storing container to minimize the radiation dose. Both the separator and the storing container can be quickly released through remote operation. Consequently, radiation dose received by person are reduced; technology and automation are enhanced; and a major breakthrough is achieved on handling radioactive solid particles.

To sum up, the present invention is an apparatus for extracting radioactive solid particles, where an extracting nozzle is used to extract radioactive solid particles to be separated out by a separator to a storing container while avoiding radioactive solid particles from entering into a suction pump; the suction pump is not polluted by secondary waste; the amount of the extracted radioactive solid particles is controlled by designing the height of a falling inlet of a suction channel; a radiation-protection device is set outside of the storing container to minimize the radiation dose; both the separator and the storing container can be quickly released through remote operation; radiation dose received by person are reduced; technology and automation are enhanced; and a major breakthrough is achieved on handling radioactive solid particles.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus for extracting radioactive solid particles, comprising
    a suction pump with a suction pipe to extract gas;
    a separator comprising a body and a chamber surrounded by said body; said body has a suction channel and a gas outlet; said suction channel is located in said chamber and connected with said body; said gas outlet is located on top of said body and adjacent to said suction channel and is connected with said suction pipe of said suction pump; said suction channel has a suction inlet located at an upper section of said suction channel to be protruded out from a top of said body; and said suction channel has a falling inlet located at a lower section of said suction channel to be protruded out from a bottom of said body;

an extracting nozzle with an extracting pipe connected to said suction inlet of the suction channel to extract radioactive solid particles to said separator;

a storage barrel installed with and connected to said extracting nozzle to store said radioactive solid particles;

a radiation-protection device installed and connected to said separator; and wherein a confined space is in said radiation-protection device as a shield to block out radiation;

a removable storing container located in said confined space of said radiation-protection device; and in communication with said suction channel of said separator; and a program controller is electrically connected with said suction pump and said extracting nozzle to control starting and stopping of said suction pump and said extracting nozzle in accordance with operating signals.

2. The apparatus according to claim 1, wherein said suction pump provides required vacuum suction and is installed with a high-efficiency particle filter at a rear end to deal with particulate matters in gas.

3. The apparatus according to claim 1, wherein said separator is a centrifugal filter.

4. The apparatus according to claim 1, wherein said separator further comprises a gasket circumferentially located on a periphery of said falling inlet.

5. The apparatus according to claim 1, wherein said falling inlet has a height different from said gas outlet to prevent said radioactive solid particles from discharging to said suction pump by following air flow.

6. The apparatus according to claim 1, wherein an amount of said radioactive solid particles being extracted is controlled by a height of said falling inlet; and wherein, when a height of said radioactive solid particles stored in said storing container reaches said height of said falling inlet, said suction channel is directly blocked to stop extracting said radioactive solid particles.

7. The apparatus according to claim 1, wherein said separator uses a method selected from a group consist of gravity and a grille design to store said extracted radioactive solid particles in said storing container while particulate matters in gas are discharged to said suction pump.

8. The apparatus according to claim 1, wherein, after entering into said suction inlet of said suction channel, said radioactive solid particles enter into said storing container through said falling inlet due to gravity.

* * * * *